(12) United States Patent
Lim et al.

(10) Patent No.: US 12,241,525 B1
(45) Date of Patent: Mar. 4, 2025

(54) UNIVERSAL DRIVE

(71) Applicants: HYUNDAI MOTOR COMPANY, Seoul (KR); KIA CORPORATION, Seoul (KR)

(72) Inventors: Woo Hyun Lim, Incheon (KR); Ki Seok Kim, Seongnam-si (KR); Kyoung Chul Min, Hwaseong-si (KR); Jong Sool Park, Hwaseong-si (KR); Dae In Lee, Anyang-si (KR); Yeo Hae Lee, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/652,378

(22) Filed: May 1, 2024

(30) Foreign Application Priority Data

Dec. 14, 2023 (KR) .......................... 10-2023-0181909

(51) Int. Cl.
| | |
|---|---|
| *F16H 1/46* | (2006.01) |
| *B60K 17/04* | (2006.01) |
| *F16H 1/02* | (2006.01) |
| *F16H 1/28* | (2006.01) |
| *F16H 37/12* | (2006.01) |
| *F16H 57/02* | (2012.01) |

(52) U.S. Cl.
CPC .......... *F16H 1/2827* (2013.01); *B60K 17/043* (2013.01); *F16H 1/46* (2013.01); *F16H 37/12* (2013.01); *F16H 2057/02043* (2013.01)

(58) Field of Classification Search
CPC . F16H 1/46; F16H 1/2827; F16H 2057/02043
See application file for complete search history.

(56) References Cited

U.S. PATENT DOCUMENTS

| | | | | |
|---|---|---|---|---|
| 3,426,610 A | * | 2/1969 | Scharer | ................... F16H 3/001 |
| | | | | 74/397 |
| 3,955,435 A | * | 5/1976 | Arick | ........................ F16H 1/32 |
| | | | | 74/411 |
| 5,360,380 A | * | 11/1994 | Nottle | ....................... F16H 3/76 |
| | | | | 475/182 |

(Continued)

FOREIGN PATENT DOCUMENTS

| | | | |
|---|---|---|---|
| CN | 111396516 A | * | 7/2020 |
| CN | 210970658 U | * | 7/2020 |

(Continued)

*Primary Examiner* — Tinh Dang
(74) *Attorney, Agent, or Firm* — MCDONNELL BOEHNEN HULBERT & BERGHOFF LLP

(57) ABSTRACT

A universal drive including a ring gear, a sun gear in which a sun gear axis is moveable relative to a ring gear axis of the ring gear, a gear train constituted by a series of gears configured to connect the sun gear and the ring gear to each other, a link mechanism connected to the sun gear and the ring gear in the state in which relative rotation therebetween is allowed such that a power transmission state between the sun gear and the ring gear is continuously maintained while accommodating a change in the inter-axis distance between the sun gear and the ring gear, a carrier installed so as to support a rotating shaft of a final gear engaged with the ring gear, and a sliding member located between at least one of the gears and the carrier.

15 Claims, 12 Drawing Sheets

(56) References Cited

U.S. PATENT DOCUMENTS

| | | | | |
|---|---|---|---|---|
| 6,132,330 | A * | 10/2000 | Leggett | F16H 47/04 475/331 |
| 8,827,857 | B2 * | 9/2014 | Ledereich | F16H 3/44 475/205 |
| 11,571,966 | B1 * | 2/2023 | Park | B60K 17/046 |
| 11,639,101 | B1 * | 5/2023 | Park | F16H 1/26 475/346 |
| 11,938,809 | B2 * | 3/2024 | Park | B60K 17/043 |
| 2020/0003277 | A1 * | 1/2020 | Sardes | B60K 17/043 |
| 2021/0260947 | A1 * | 8/2021 | Sardes | B60G 3/207 |
| 2023/0311645 | A1 * | 10/2023 | Park | B60G 15/062 180/55 |
| 2023/0311646 | A1 * | 10/2023 | Park | F16H 1/36 74/409 |

FOREIGN PATENT DOCUMENTS

| | | | | |
|---|---|---|---|---|
| CN | 114714899 A | * | 7/2022 | |
| WO | WO-2013173915 A1 | * | 11/2013 | B60K 1/02 |

* cited by examiner

UNIVERSAL DRIVE

CROSS REFERENCE TO RELATED APPLICATIONS

This application claims the benefit of Korean Patent Application No. 10-2023-0181909, filed on Dec. 14, 2023 with the Korean Intellectual Property Office, the disclosure of which is herein incorporated by reference in its entirety.

BACKGROUND

1. Field of the Disclosure

The present disclosure relates to a drive that receives power from a rotational power source, such as a motor, and outputs shifted torque.

2. Description of the Related Art

A drive of a vehicle transmits power from a rotational power source, such as an engine or a motor, to wheels in order to drive the vehicle.

Recently, an in-wheel motor type drive, configured such that a motor is directly installed at a drive wheel, has been proposed, but the in-wheel motor type drive is not widely used due to low durability of the motor and poor ride comfort caused by increased unsprung mass.

The matters disclosed in this section are merely for enhancement of understanding of the general background of the disclosure and should not be taken as an acknowledgment or any form of suggestion that the matters form the related art already known to a person skilled in the art.

SUMMARY

It is an object of the present disclosure to provide a universal drive that receives power from a rotational power source, such as a motor, and outputs shifted torque, wherein, when the universal drive is applied to a vehicle, input power may be appropriately reduced to secure excellent uphill driving and acceleration driving performance, the power source, such as the motor, may be installed in a state of being separated from a wheel that is subjected to severe shock and vibration, thereby improving durability of the power source and securing excellent ride comfort by reducing the unsprung mass of the vehicle compared to an in-wheel motor drive, continuous power transmission from the power source is possible in response to the motion of the wheel without using a constant velocity joint or the like, whereby the space between the power source and the wheel is reduced, and therefore it is possible to secure excellent space utilization between left and right wheels.

It is another object of the present disclosure to maintain smooth operation of the universal drive and to improve durability thereof.

Objects of the present disclosure are not limited to the aforementioned object, and other unmentioned objects will be clearly understood by those skilled in the art based on the following description.

In accordance with the present disclosure, the above and other objects can be accomplished by the provision of a universal drive including a ring gear, a sun gear in which a sun gear axis is moveable relative to a ring gear axis of the ring gear, a gear train constituted by a series of gears configured to connect the sun gear and the ring gear to each other, a link mechanism connected to the sun gear and the ring gear in the state in which relative rotation therebetween is allowed such that the power transmission state between the sun gear and the ring gear is continuously maintained while accommodating a change in the inter-axis distance between the sun gear and the ring gear, the link mechanism being configured to support rotating shafts of the gears constituting the gear train, a carrier installed so as to support a rotating shaft of a final gear engaged with the ring gear, among the gears constituting the gear train, and a sliding member installed so as to be located between at least one of the gears constituting the gear train and the carrier such that the sliding member is slidable relative to the carrier.

The link mechanism may include a first link and a second link rotatably connected to each other, a gear having a rotating shaft configured to rotatably support the first link and the second link may be a joint gear, and the gear train may include a first intermediate gear configured to connect the sun gear and the joint gear to each other, a second intermediate gear configured to connect the joint gear and a final gear to each other, the joint gear, and the final gear.

The sliding member may be installed at at least one of between the first intermediate gear and the carrier, between the joint gear and the carrier, and between the second intermediate gear and the carrier.

The sliding member may be inserted into each end of at least one of a rotating shaft of the first intermediate gear, a rotating shaft of the joint gear, and a rotating shaft of the second intermediate gear.

The sliding member may be constituted by a plastic washer inserted into an outer side of at least one of the rotating shaft of the first intermediate gear, the rotating shaft of the joint gear, and the rotating shaft of the second intermediate gear.

The sliding member may have a plurality of oil recesses formed in the surface thereof facing the carrier.

The sliding member may be constituted by a thrust bearing inserted into at least one of the rotating shaft of the first intermediate gear, the rotating shaft of the joint gear, and the rotating shaft of the second intermediate gear.

The carrier may be provided with a contact avoidance portion configured to avoid contact between the sun gear and the ring gear when the inter-axis distance between the sun gear and the ring gear changes, and the sliding member may be provided at each end of the rotating shaft of a gear that does not abut the contact avoidance portion, among the gears constituting the gear train.

The carrier may be constituted by a carrier outer and a carrier inner coupled to each other, the carrier outer and the carrier inner being configured to support the rotating shaft of the final gear on opposite sides, a contact avoidance recess constituting the contact avoidance portion may be formed in the surface of the carrier outer facing the gear train, and the carrier inner may be provided with a contact avoidance hole, through which an input shaft connected to the sun gear extends, the contact avoidance hole constituting the contact avoidance portion.

The sliding member may be installed between each end of the second intermediate gear and the carrier.

A wheel hub may be connected to the ring gear.

The ring gear and the wheel hub may be concentrically spline-coupled to each other.

A carrier boss inserted into the wheel hub may be integrally formed at the carrier outer, and a hub bearing may be provided between the carrier boss and the wheel hub.

The sun gear, the joint gear, and the final gear may have the same number of teeth.

The link mechanism and the gear train supported by the link mechanism may be include a plurality of link mechanisms and gear trains.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Description will now be given in detail according to embodiments disclosed herein with reference to the accompanying drawings. For the sake of brief description with reference to the drawings, the same or equivalent elements may be provided with the same reference numbers, and description thereof will not be repeated.

Suffixes such as "module" and "unit" may be used to refer to elements. Use of such a suffix herein is merely intended to facilitate description of the specification, and the suffix itself is not intended to have any special meaning or function.

In describing embodiments disclosed herein, a detailed description of known functions and configurations incorporated herein will be omitted when it may make the subject matter of the present disclosure rather unclear. In addition, the accompanying drawings are used to aid in ease of understanding various technical features and it should be understood that embodiments disclosed herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that, when an element is referred to as being "connected to" or "coupled to" another element, it may be directly connected to or coupled to the other element, or intervening elements may be present. In contrast, when an element is referred to as being "directly connected to" or "directly coupled to" another element, there are no intervening elements present.

A singular representation may include a plural representation unless it represents a definitely different meaning from the context.

It will be further understood that the terms "comprises", "has" and the like, when used in this specification, specify the presence of stated features, numbers, steps, operations, elements, parts, or combinations thereof, but do not preclude the presence or addition of one or more other features, numbers, steps, operations, elements, parts, or combinations thereof.

Figure 1:
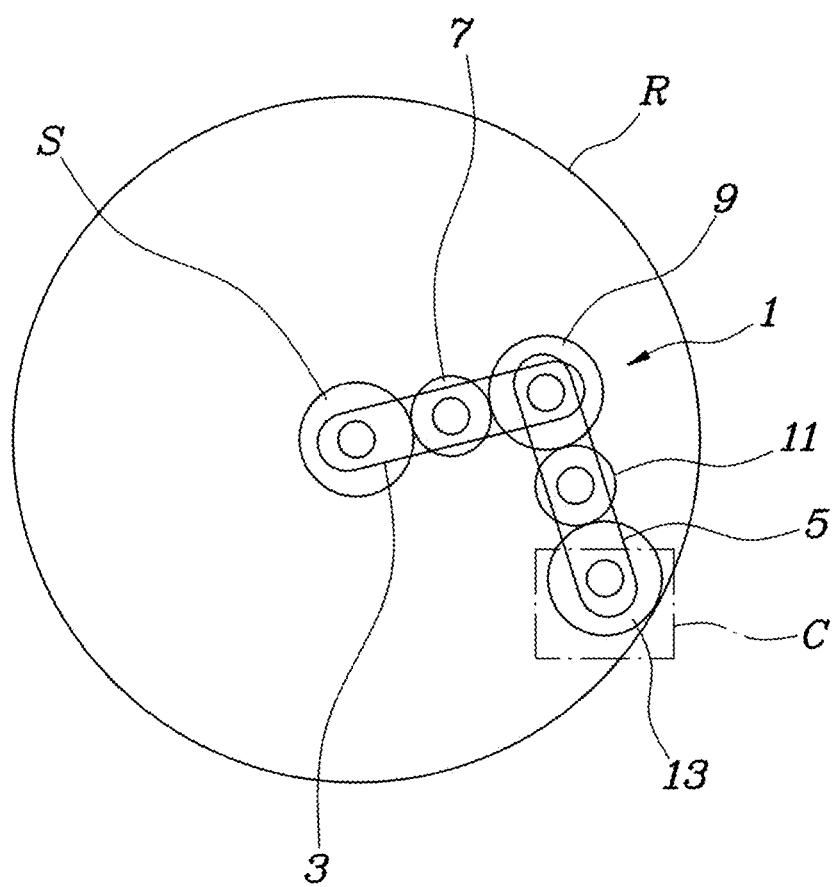
FIG. 1 is a view showing a basic configuration of a universal drive according to the present disclosure.
Figure 2:
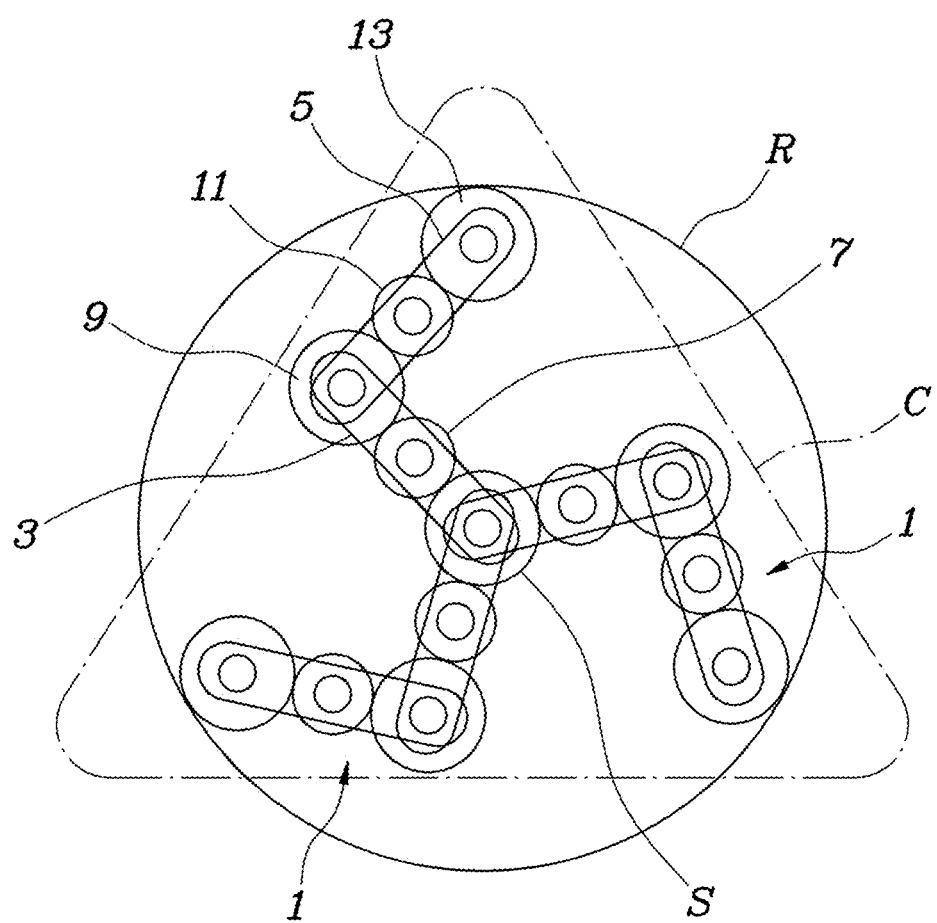
FIG. 2 is a view showing an embodiment of the universal drive according to the present disclosure.

For reference, FIG. 1 shows a basic configuration of a universal drive according to the present disclosure, wherein one gear train 1 is provided to illustrate the principle, and FIG. 2 shows an example in which three gear trains 1 are provided.

Referring to FIGS. 1 to 7, the universal drive U (FIG. 6) according to the disclosure includes a ring gear R, a sun gear S in which a sun gear axis is moveable relative to a ring gear axis of the ring gear R, a gear train 1 configured to connect the sun gear S and the ring gear R to each other, and a link mechanism connected to the sun gear S and the ring gear R in the state in which relative rotation therebetween is allowed such that the power transmission state between the sun gear S and the ring gear R is continuously maintained while accommodating a change in the inter-axis distance between the sun gear S and the ring gear R, the link mechanism being configured to support rotating shafts of gears constituting the gear train 1.

In this embodiment, the link mechanism includes a first link 3 having one end configured to support the rotating shaft of the sun gear S and a second link 5 rotatably connected to the first link 3.

That is, the gear train 1 includes a series of gears disposed such that rotating shafts thereof are supported by the first link 3 and the second link 5 so as to transmit torque between the sun gear S and the ring gear R.

In this embodiment, the gear train 1 includes a first intermediate gear 7 engaged with the sun gear S, a joint gear 9 engaged with the first intermediate gear 7, a rotating shaft of the joint gear 9 being configured to function as a rotating shaft between the first link 3 and the second link 5, a second intermediate gear 11 engaged with the joint gear 9, and a final gear 13 engaged with the second intermediate gear 11 and the ring gear R.

A rotating shaft of the first intermediate gear 7 and the rotating shaft of the joint gear 9 are fixed to the first link 3, the rotating shaft of the joint gear 9, a rotating shaft of the second intermediate gear 11, and a rotating shaft of the final gear 13 are fixed to the second link 5, and the rotating shaft of the final gear 13 is supported by a carrier C whose motion is constrained relative to the ring gear R.

Here, the number of teeth of each of the sun gear S and the joint gear 9 is formed to be the same as the number of teeth of the final gear 13.

That is, the sun gear S, the joint gear 9, and the final gear 13 have the same number of teeth.

When the sun gear S, the joint gear 9, and the final gear 13 have the same number of teeth as described above, the relative phase of the sun gear S and the ring gear R is kept constant with respect to the relative motion of the rotating shafts of the sun gear S and the ring gear R in upward, downward, leftward, and rightward directions.

Figure 3:
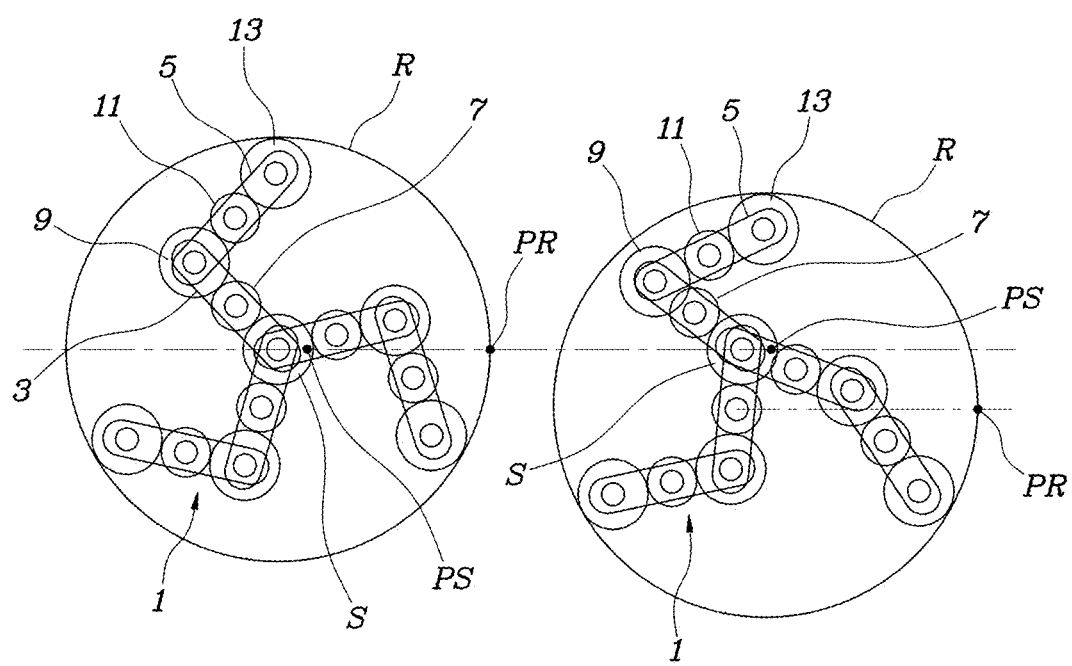
FIG. 3 is a view illustrating the state in which a ring gear is moved downward relative to the state of FIG. 2 by comparison.
Figure 4:
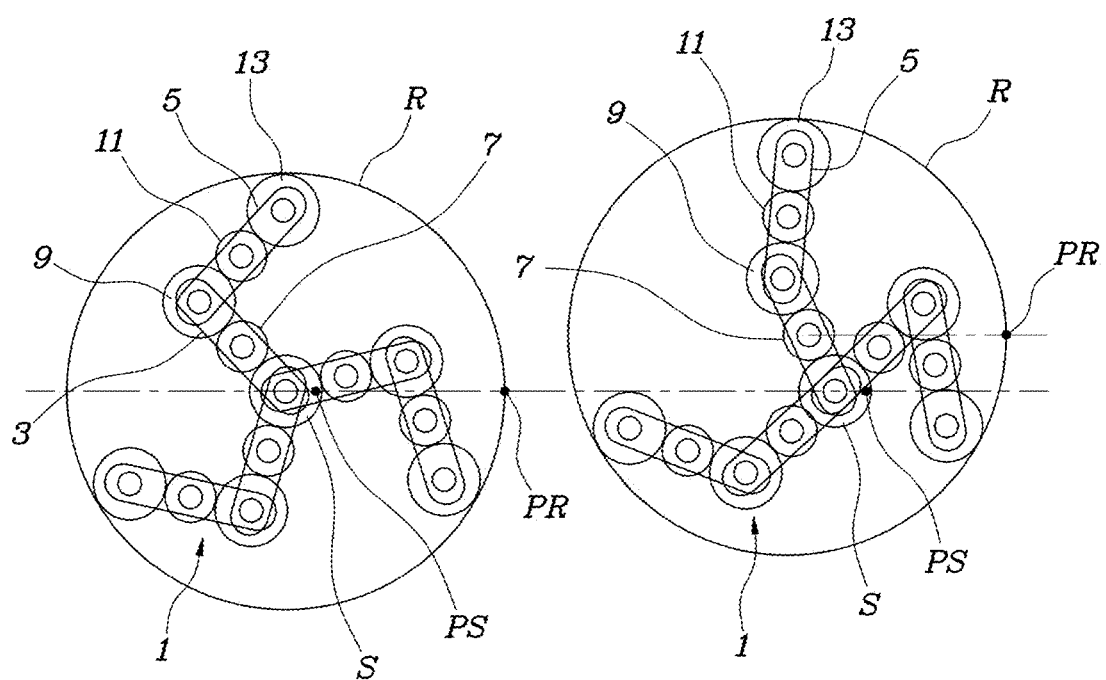
FIG. 4 is a view illustrating the state in which the ring gear is moved upward relative to the state of FIG. 2 by comparison.
Figure 5:
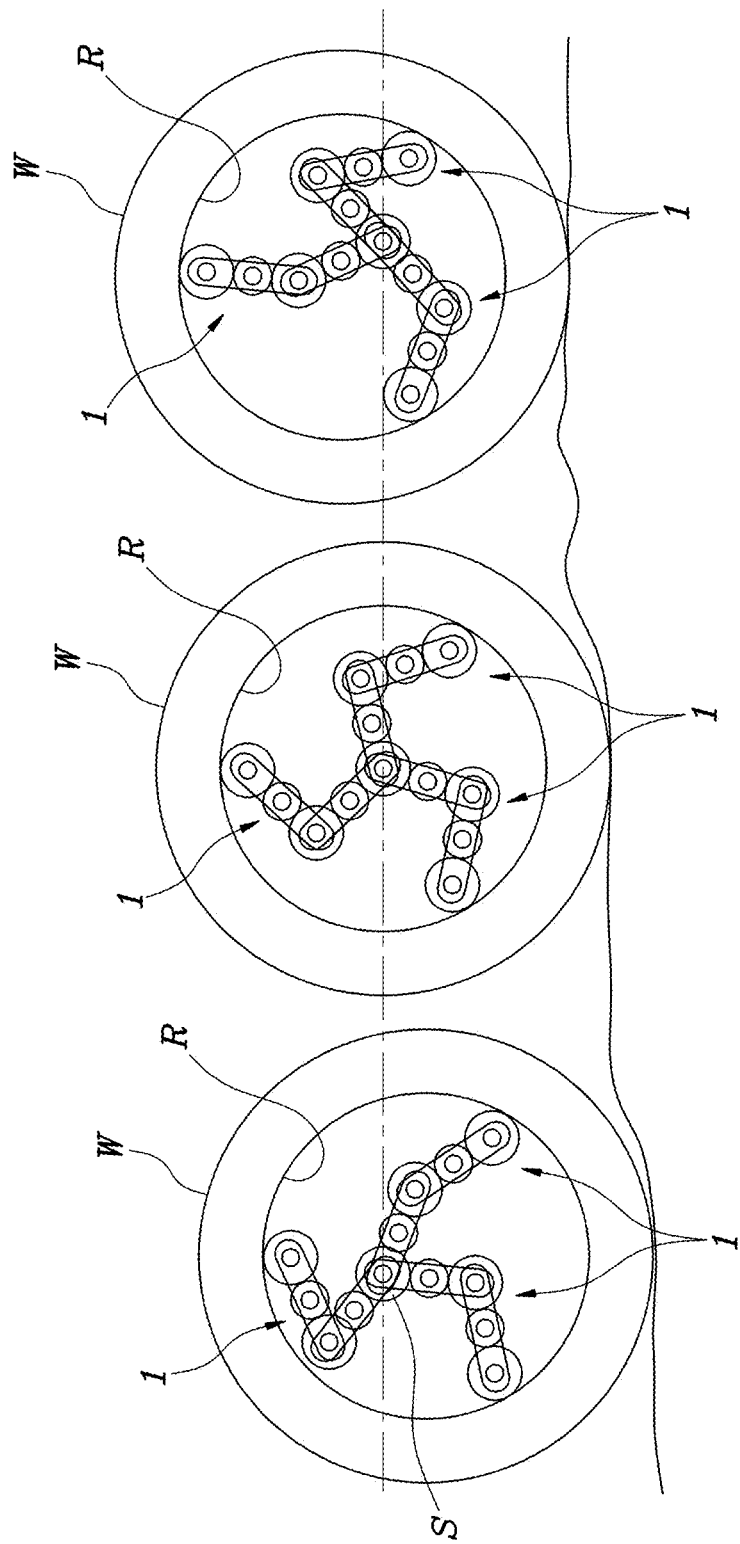
FIG. 5 is a view showing an example in which the embodiment of FIG. 2 is applied to a vehicle, showing upward and downward movement of the ring gear and a wheel relative to a sun gear depending on the change of a road surface by comparison.

Here, the relative phase of the sun gear S and the ring gear R being kept constant with respect to the relative motion of the of the sun gear S and the ring gear R may be expressed as the rotational phase of points PS and PR respectively indicated on the sun gear S and the ring gear R in FIGS. 3 and 4 being kept constant even when the ring gear (R) is moved upward and downward or moved leftward and rightward with respect to the sun gear S.

That is, when the sun gear S, the joint gear 9, and the final gear 13 have the same number of teeth, relative rotation between the sun gear S and the ring gear R due to a change in the inter-axis distance between the sun gear S and the ring gear R does not occur.

As a result, power transmitted from the sun gear S is transmitted to the ring gear R at a constant speed regardless of a change in the inter-axis distance between the sun gear S and the ring gear R. Consequently, in the case in which the universal drive U according to the present disclosure is applied to a vehicle, when power generated by a motor M is transmitted from the sun gear S to a wheel W via the ring gear R, even though the ring gear R and wheel W are moved upward and downward or moved leftward and rightward with respect to the rotating shafts of the motor M or the sun gear S, there is no change in the phase of the motor M connected to the sun gear S and the phase of the wheel W connected to the ring gear R, whereby output torque may be stably controlled through the motor M, and therefore stable driving of the vehicle may be achieved.

If the above conditions are not satisfied, whereby any one of the sun gear S, the joint gear 9, and the final gear 13 has a different number of teeth, even though the motor M rotates at a constant speed as described above, the ring gear R and the wheel W move upward, downward, leftward, and rightward with respect to the sun gear S and the motor (M). As a result, relative rotation between the sun gear S and the ring gear R occurs, whereby the vehicle may experience a vibration in a driving direction of the vehicle, i.e., a surging phenomenon.

Figure 6:
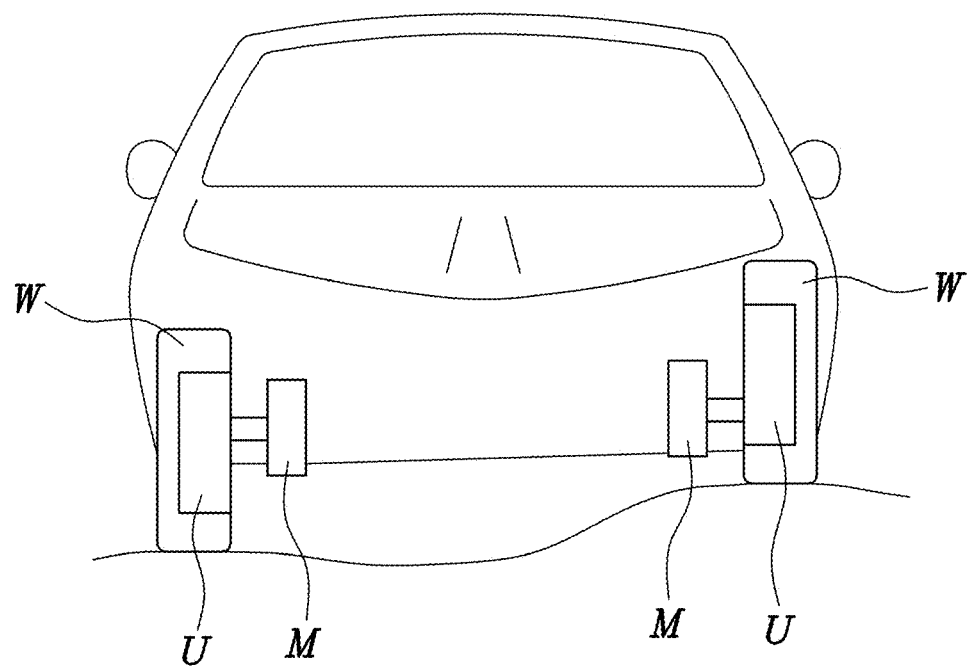
FIG. 6 is a view illustrating an example in which the universal drive according to the present disclosure is applied to a vehicle.
Figure 7:
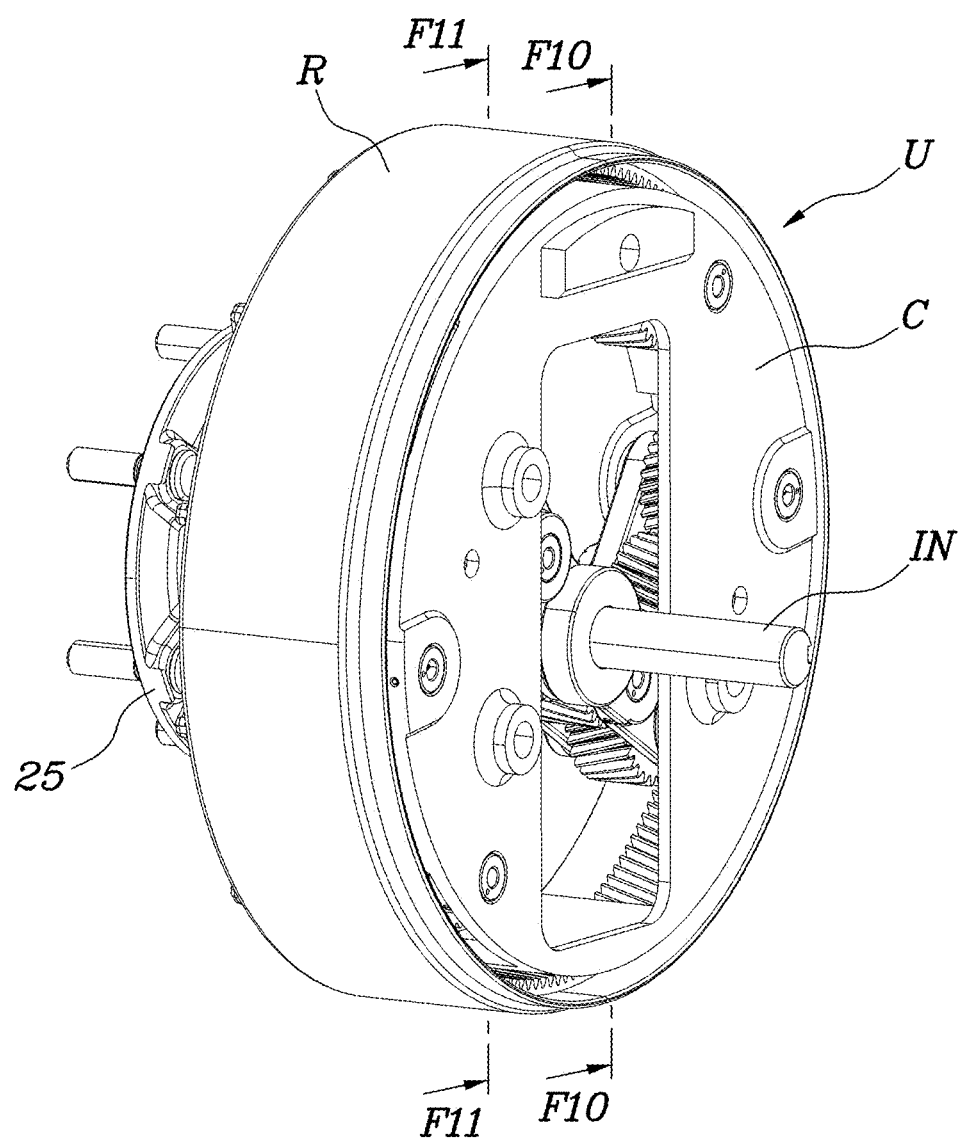
FIG. 7 is a view showing another embodiment of the universal drive according to the present disclosure.
Figure 8:
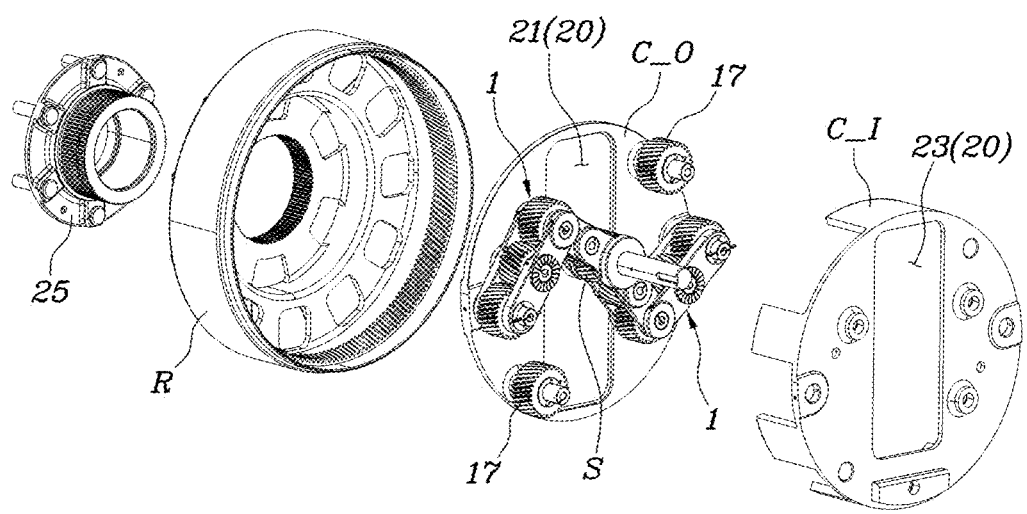
FIG. 8 is an exploded perspective view of the universal drive of FIG. 7.
Figure 9:
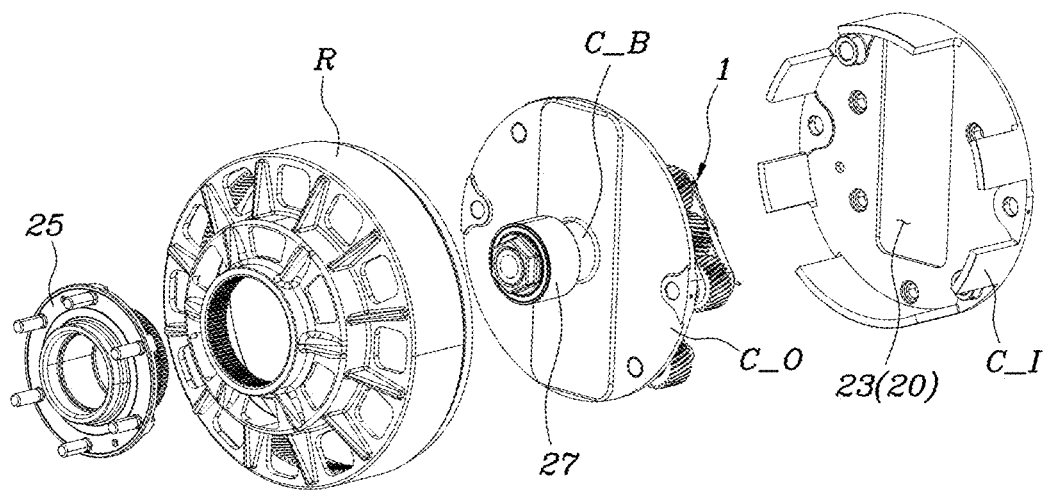
FIG. 9 is an exploded perspective view of FIG. 8 when viewed in the opposite direction.
Figure 10:
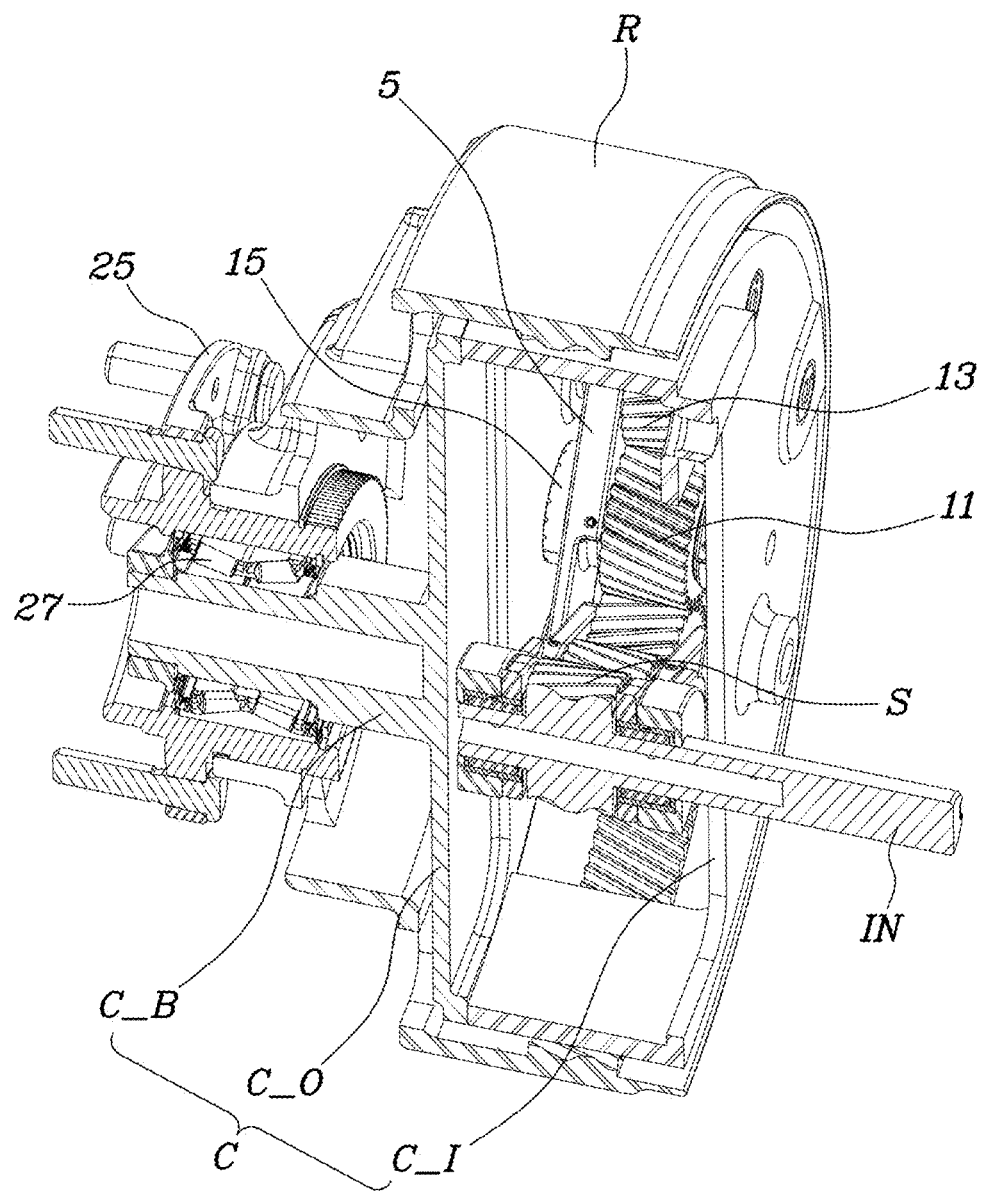
FIG. 10 is a sectional view taken along line F10-F10 of FIG. 7.
Figure 11:
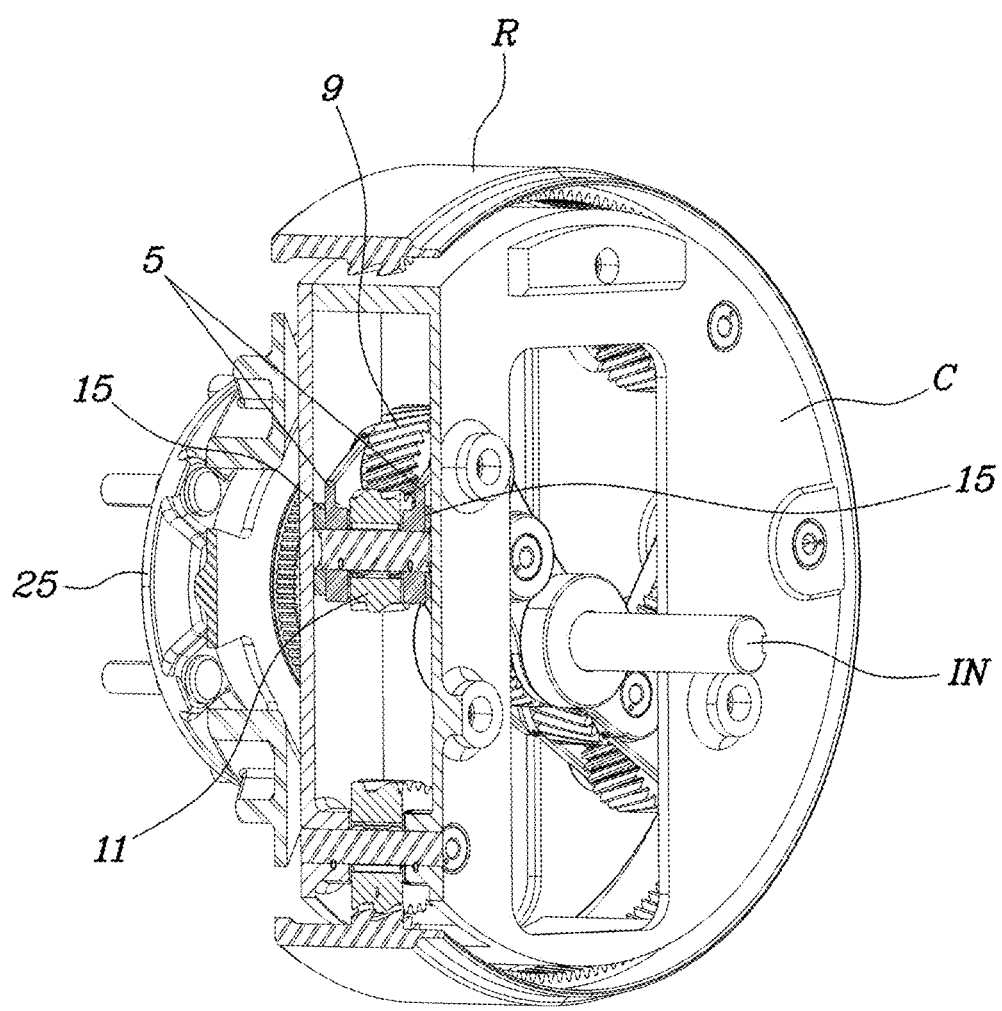
FIG. 11 is a sectional view taken along line F11-F11 of FIG. 7.
Figure 12:
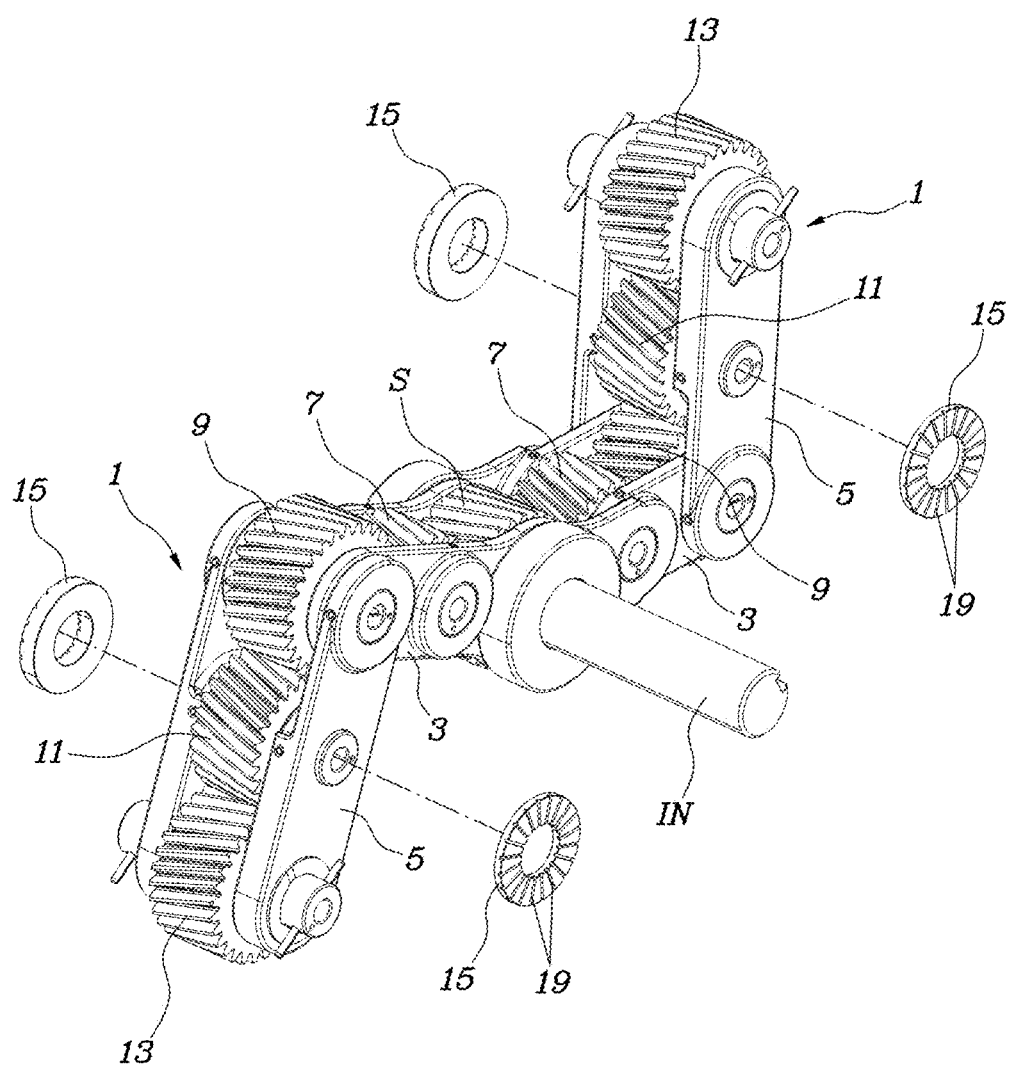
FIG. 12 is a view showing a sliding member applied to a gear train of FIG. 8 in a separated state.

Referring to FIG. 6, the rotating shaft of the motor M is connected to the sun gear S, and the wheel W is connected to the ring gear R, whereby the universal drive U according to the present disclosure may be used as a drive of the vehicle.

In this case, power input to the sun gear S is decelerated and output to the ring gear R, thereby securing excellent uphill driving and acceleration of the vehicle.

In addition, since the motor M is not installed in the wheel W but may be installed separately on the outside of the wheel W, which is subjected to severe shock and vibration, durability of the motor M may be improved, and excellent ride comfort may be secured by reducing the unsprung mass of the vehicle compared to an in-wheel motor drive.

Furthermore, constant power may be transmitted to the sun gear S connected to the power source, as described above, while upward and downward movement of the ring gear R to which the wheel W is connected is allowed, whereby continuous power transmission from the power source is possible in response to the upward, downward, leftward, and rightward movements of the wheel W without using a conventional constant velocity joint, and therefore the space between the power source and the wheel W is reduced, ultimately making it possible to manufacture a vehicle with excellent space utilization between a left wheel W and a right wheel W.

Meanwhile, referring to FIGS. 7 to 12, the universal drive U according to the present disclosure includes a ring gear R, a sun gear S installed such that the distance between a rotating shaft of the sun gear S and a rotating shaft of the ring gear R is changeable, a gear train 1 constituted by a series of gears configured to connect the sun gear S and the ring gear R to each other, a link mechanism connected to the sun gear S and the ring gear R in the state in which relative rotation therebetween is allowed such that the power transmission state between the sun gear S and the ring gear R is continuously maintained while accommodating a change in the inter-axis distance between the sun gear S and the ring gear R, the link mechanism being configured to support rotating shafts of the gears constituting the gear train 1, a carrier C installed so as to support a rotating shaft of a final gear 13 engaged with the ring gear R, among the gears constituting the gear train 1, and a sliding member 15 installed so as to be located between at least one of the gears constituting the gear train 1 and the carrier C such that the sliding member is slidable relative to the carrier C.

That is, in the present disclosure, the sliding member 15 is provided between the carrier C and the gears that move relative to the carrier C, as described above, whereby it is possible to prevent axial wobble of the link mechanism and the gear train 1 of the universal drive U, to maintain smooth operation, and to improve durability.

Since the gears constituting the gear train 1 are formed as helical gears with a torsion angle as illustrated, noise at the time of power transmission may be greatly reduced, but when transmission torque changes and the inter-axis distance between the sun gear S and the ring gear R changes, axial force is generated, whereby axial wobble of the gear train 1 and the link mechanism may occur. However, when the sliding member 15 is provided between the carrier C and the gears of the gear train 1 in order to support the gear train 1 and the link mechanism, as in the present disclosure, axial wobble of the gear train 1 and the link mechanism is inhibited, whereby it is possible to maintain smooth operation.

For reference, the embodiment of FIGS. 7 to 12 has two link mechanisms and two gear trains 1, unlike the embodiment of FIGS. 1 and 2.

In addition, a support gear 17 configured to further support the ring gear R is installed at the carrier C.

The link mechanism includes a first link 3 and a second link 5 rotatably connected to each other as described above, a gear having a rotating shaft configured to rotatably support the first link 3 and the second link 5 is a joint gear 9, and the gear train 1 includes a first intermediate gear 7 configured to connect the sun gear S and the joint gear 9 to each other, a second intermediate gear 11 configured to connect the joint gear 9 and a final gear 13 to each other, the joint gear 9, and the final gear 13.

The sliding member 15 may be installed at at least one of between the first intermediate gear 7 and the carrier C, between the joint gear 9 and the carrier C, and between the second intermediate gear 11 and the carrier C.

That is, the sliding member 15 may be inserted into each end of at least one of a rotating shaft of the first intermediate gear 7, a rotating shaft of the joint gear 9, and a rotating shaft of the second intermediate gear 11.

The sliding member 15 may be constituted by a plastic washer inserted into the outer side of at least one of the rotating shaft of the first intermediate gear 7, the rotating shaft of the joint gear 9, and the rotating shaft of the second intermediate gear 11.

The sliding member 15 may have a plurality of oil recesses 19 formed in the surface thereof facing the carrier C.

Consequently, lubricating oil supplied between the carrier C and the gear train 1 is introduced into the oil recesses 19, whereby it is possible to minimize friction between the carrier C and the sliding member 15.

In addition, the sliding member 15 may be constituted by a thrust bearing inserted into at least one of the rotating shaft of the first intermediate gear 7, the rotating shaft of the joint gear 9, and the rotating shaft of the second intermediate gear 11.

For reference, the shown sliding member 15 is constituted by the plastic washer in the illustrated example.

Meanwhile, the carrier C is provided with a contact avoidance portion 20 configured to avoid contact between the sun gear S and the ring gear R when the inter-axis distance between the sun gear S and the ring gear R changes, and the sliding member 15 is provided at each end of the rotating shaft of a gear that does not abut the contact avoidance portion 20, among the gears constituting the gear train 1.

The carrier C is constituted by a carrier outer C_O and a carrier inner C_I coupled to each other, the carrier outer C_O and the carrier inner C_I being configured to support the rotating shaft of the final gear 13 on opposite sides, a contact avoidance recess 21 constituting the contact avoidance portion 20 is formed in the surface of the carrier outer C_O facing the gear train 1, and the carrier inner C_I is provided with a contact avoidance hole 23, through which an input shaft IN connected to the sun gear S extends, the contact avoidance hole 23 constituting the contact avoidance portion 20.

When the inter-axis distance between the sun gear S and the ring gear R changes, therefore, the sun gear S may move relative to the ring gear R without interfering with the carrier C while continuing to smoothly transmit power to the ring gear R.

In this case, the sliding member 15 is installed between each end of the second intermediate gear 11 and the carrier C.

That is, when the contact avoidance recess 21 of the carrier outer C_O and the contact avoidance hole 23 of the carrier inner C_I are provided as described above, the gear that does not reliably abut the contact avoidance recess 21 and the contact avoidance hole 23, among the gears constituting the gear train 1, is the second intermediate gear 11, and therefore the sliding member 15 is installed between each end of the second intermediate gear 11 and the carrier C.

If the sliding member 15 is provided at a gear that is likely to abut the contact avoidance recess 21 of the carrier outer C_0 and the contact avoidance hole 23 of the carrier inner C_I during operation of the universal drive U according to the present embodiment, such as the first intermediate gear 7 or the joint gear 9, it may be difficult to secure a stable mounting condition.

For reference, the input shaft IN may be integrally formed with the sun gear S, or a separate shaft may be inserted through the sun gear S.

Meanwhile, in this embodiment, a wheel hub 25 is concentrically spline-coupled to the ring gear R.

When a wheel is mounted to the wheel hub 25, therefore, the universal drive U according to the present disclosure may be used as a drive wheel of the vehicle.

Here, a carrier boss C_B inserted into the wheel hub 25 is integrally formed at the carrier outer C_O, and a hub bearing 27 is provided between the carrier boss C_B and the wheel hub 25.

Consequently, the concentric arrangement between the carrier C, the wheel hub 25, and the ring gear R may be stably maintained, and smooth operation and durability may be secured.

As is apparent from the above description, the present disclosure provides a universal drive that receives power from a rotational power source, such as a motor, and outputs shifted torque, wherein, when the universal drive is applied to a vehicle, input power may be appropriately reduced to secure excellent uphill driving and acceleration driving performance, the power source, such as the motor, may be installed in a state of being separated from a wheel that is subjected to severe shock and vibration, thereby improving durability of the power source and securing excellent ride comfort by reducing the unsprung mass of the vehicle compared to an in-wheel motor drive, continuous power transmission from the power source is possible in response to the motion of the wheel without using a constant velocity joint or the like, whereby the space between the power source and the wheel is reduced, and therefore it is possible to secure excellent space utilization between left and right wheels.

In particular, smooth operation of the universal drive may be maintained, and durability of the universal drive may be improved.

Although specific embodiments of the present disclosure have been shown and described above, it will be apparent to those skilled in the art that various modifications and variations can be made in the present disclosure without departing from the technical idea of the present disclosure defined by the appended claims.

The invention claimed is:

1. A universal drive comprising:
   a ring gear;
   a sun gear having a sun gear axis moveable relative to a ring gear axis of the ring gear;
   a gear train comprising a series of gears configured to connect the sun gear and the ring gear to each other;
   a link mechanism connected to the sun gear and the ring gear so rotation between the sun gear and the ring gear is allowed such that a power transmission state between the sun gear and the ring gear is continuously maintained while accommodating a change in an inter-axis distance between the sun gear and the ring gear, the link mechanism being configured to support rotating shafts of the series of gears constituting the gear train;
   a carrier configured to support a rotating shaft of a final gear engaged with the ring gear, among the gears constituting the gear train; and
   a sliding member positioned between at least one of the gears constituting the gear train and the carrier such that the sliding member is slidable relative to the carrier.

2. The universal drive according to claim 1, wherein:
   the link mechanism comprises a first link and a second link rotatably connected to each other;
   a joint gear has a rotating shaft configured to rotatably support the first link and the second link; and
   the gear train comprises a first intermediate gear configured to connect the sun gear and the joint gear to each other, a second intermediate gear configured to connect the joint gear and a final gear to each other, the joint gear, and the final gear.

3. The universal drive according to claim 2, wherein the sliding member is positioned at at least one of between the first intermediate gear and the carrier, between the joint gear and the carrier, and between the second intermediate gear and the carrier.

4. The universal drive according to claim 3, wherein the sliding member is configured to be inserted into each end of at least one of a rotating shaft of the first intermediate gear, a rotating shaft of the joint gear, and a rotating shaft of the second intermediate gear.

5. The universal drive according to claim 4, wherein the sliding member comprises a plastic washer inserted into an outer side of at least one of the rotating shaft of the first intermediate gear, the rotating shaft of the joint gear, and the rotating shaft of the second intermediate gear.

6. The universal drive according to claim 5, wherein the sliding member has a plurality of oil recesses formed in a surface facing the carrier.

7. The universal drive according to claim 4, wherein the sliding member comprises a thrust bearing inserted into at least one of the rotating shaft of the first intermediate gear, the rotating shaft of the joint gear, and the rotating shaft of the second intermediate gear.

8. The universal drive according to claim 2, wherein:
the carrier includes a contact avoidance portion configured to avoid contact between the sun gear and the ring gear when the inter-axis distance between the sun gear and the ring gear changes; and
the sliding member is positioned at each end of the rotating shaft of a gear that does not abut the contact avoidance portion, among the gears constituting the gear train.

9. The universal drive according to claim 8, wherein:
the carrier comprises a carrier outer and a carrier inner coupled to each other, the carrier outer and the carrier inner being configured to support the rotating shaft of the final gear on opposite sides;
the contact avoidance portion includes a contact avoidance recess formed in a surface of the carrier outer facing the gear train; and
the contact avoidance portion further includes a contact avoidance hole positioned on the carrier inner through which an input shaft connected to the sun gear extends.

10. The universal drive according to claim 9, wherein the sliding member is positioned between each end of the second intermediate gear and the carrier.

11. The universal drive according to claim 9, wherein a wheel hub is connected to the ring gear.

12. The universal drive according to claim 11, wherein the ring gear and the wheel hub are concentrically spline-coupled to each other.

13. The universal drive according to claim 11, wherein a carrier boss inserted into the wheel hub is integrally formed at the carrier outer, and a hub bearing is positioned between the carrier boss and the wheel hub.

14. The universal drive according to claim 2, wherein the sun gear, the joint gear, and the final gear have a same number of teeth.

15. The universal drive according to claim 14, wherein the link mechanism comprises a plurality of link mechanisms, and the gear train supported by the link mechanism includes a plurality of gear trains.

* * * * *